US006263128B1

United States Patent
Huang

(10) Patent No.: US 6,263,128 B1
(45) Date of Patent: Jul. 17, 2001

(54) FIBER UNBALANCED MACH-ZEHNDER INTERFEROMETERS WITH FLAT-TOP SPECTRAL RESPONSE FOR APPLICATION IN WAVELENGTH DIVISION MULTIPLEXERS

(75) Inventor: Chi-Hung Huang, Fremont, CA (US)

(73) Assignee: WaveSplitter Technologies, Inc., Fremont, CA (US)

(*) Notice: Subject to any disclaimer, the term of this patent is extended or adjusted under 35 U.S.C. 154(b) by 0 days.

(21) Appl. No.: 09/324,238

(22) Filed: Jun. 2, 1999

(51) Int. Cl.[7] ........................................... G02B 6/28
(52) U.S. Cl. ................... 385/24; 385/31; 385/37
(58) Field of Search ........................ 385/24, 31, 33, 385/37

(56) References Cited

U.S. PATENT DOCUMENTS 4,978,188 * 12/1990 Kawachi et al. .................... 385/37
5,477,323 * 12/1995 Andrews et al. ................... 356/345

OTHER PUBLICATIONS

Takato et al, "Silica–Based integrated optic Mach–Zehnder multi/demultiplexer family with channel spacing of 0.01–250nm", IEEE Journal on selected areas in communications, vol. 8, No. 6, p. 1120–11127, Aug. 1990.*

Mizuochi et al, "Interferometric crosstalk–free optical add/drop multiplexer using Mach–Zehnder–based fiber gratings", Journal of lightwave technology, vol. 16, No. 2, p. 265–276, Aug. 1990.*

* cited by examiner

Primary Examiner—Rodney Bovernick
Assistant Examiner—Ellen E. Kim
(74) Attorney, Agent, or Firm—Skjerven Morrill MacPherson LLP; Tom Chen

(57) ABSTRACT

According to the present invention, a multi-window wavelength division multiplexer (MWDM) is coupled to a correcting filter characterized by a shallow modulation depth and a channel separation smaller than the MWDM. A correcting filter is coupled to an input of the MWDM or to each of the two outputs of the MWDM. By changing the modulation depth and/or channel separation of the correcting filter(s), the spectral response of the filter can be adjusted to produce a more uniform gain (i.e., a "flat-top" spectral response) across wavelengths of passbands within the MWDM. In one embodiment, the correcting filter is an unbalanced Mach-Zehnder interferometer formed with two fused-fiber couplers having non-equal splitting ratios. In other embodiments, the correcting filter is a Fabry-Perot interferometer having a low end-face reflectivity.

19 Claims, 5 Drawing Sheets

FIBER UNBALANCED MACH-ZEHNDER INTERFEROMETERS WITH FLAT-TOP SPECTRAL RESPONSE FOR APPLICATION IN WAVELENGTH DIVISION MULTIPLEXERS

BACKGROUND OF THE INVENTION

1. Field of the Invention

The present invention relates to multi-window wavelength division multiplexers (MWDMs) and filters and, in particular, to MWDMs with uniform spectral response within passbands using unbalanced Mach-Zehnder interferometers and Fabry-Perot filters.

2. Discussion of the Related Art

With existing fiber optic networks, there is often the need to increase information transmission capacity. However, both physical and economic constraints can limit the feasibility of increasing transmission capacity. For example, installing additional fiber optic cable to support additional signal channels can be cost prohibitive, and electronic system components may impose physical limitations on the speed of information that can be transmitted. The use of wavelength division multiplexers (WDMs) provides a simple and economical way to increase the transmission capacity of fiber optic communication systems by allowing multiple wavelengths to be transmitted and received over a single optical fiber through signal wavelength multiplexing and demultiplexing. In addition, WDMs can be used in fiber optic communication systems for other purposes, such as dispersion compensation and noise reduction.

WDMs can be manufactured using, for example, biconical tapered fusion (BTF) technology. Typically, two optical fibers are fused together along an interior portion to form a fused-fiber coupler, so that light of two wavelengths (e.g., 1310 nm and 1550 nm) entering the input ports of the first and second fibers, respectively, are multiplexed onto a single fiber. The coupling ratios for the two channels (the signals at 1310 nm and 1550 nm) exhibit complementary sinusoidal behavior for amplitude as a function of frequency within the passband of the WDM, with each channel having one or more peaks (or windows) within the passband. Information carried by the two signals along the single fiber is then demultiplexed at the WDM outputs.

Multi-window WDMs (MWDMs) have two or more peaks of amplitude as a function of frequency (or operational windows) for each channel within a passband. MWDMs can also be made using BTF technology by twisting two optical fibers together, fusing the center portion together, and pulling the fibers until a desired multi-window transmission spectrum appears at a monitored fiber output port. MWDMs can also be made using unbalanced Mach-Zehnder interferometers (MZIs), as disclosed in commonly-owned U.S. patent application Ser. No. 09/034,895, entitled "Fused-Fiber Multi-Window Wavelength Division Multiplexer Using Unbalanced Mach-Zehnder Interferometer", filed Mar. 3, 1998, which is incorporated by reference in its entirety.

FIG. 1 shows a fused-fiber MWDM 10 formed from an unbalanced MZI, which uses identical first fused-fiber coupler 11 and second fused-fiber coupler 12, coupled together by connecting fibers 13 and 14 having different optical path lengths. Fused-fiber couplers 11 and 12 can be formed by heating and axially stretching two optic fibers to form a fused coupling region. Broadband light at two wavelengths, entering coupler 11 or 12 at input ports 15-1 and 15-2 or 16-1 or 16-2, respectively, couple onto and travel along the fused coupling region. The light then decouples and exits coupler 11 or 12 at output ports 17-1 and 17-2 or 18-1 and 18-2, respectively. Couplers 11 and 12 are typically 3-dB couplers, so that power entering an input port (e.g., 15-1) is equally divided between two output ports (e.g., 17-1 and 17-2). The different optical path lengths of connecting fibers 13 and 14 result in the two optical signals arriving at the next coupler stage at different times, so that optical signals propagating through the connecting fibers are phase-shifted.

FIG. 2 shows the transmission spectrum from output ports 18-1 and 18-2, which consists of alternating peaks and nulls. Due to the optical path length difference between the two connecting fibers 13 and 14, different constructive and destructive interference occurs at different wavelengths, resulting in the spectrum of FIG. 2. Solid line 21 represents the amplitude as a function of frequency of the output signal from one transmission channel (e.g., output port 18-1), while dashed line 22 represents the amplitude as a function of frequency for the simultaneous output signal from the other transmission channel (e.g., output port 18-2).

The channel spacing $\Delta\lambda$ of an MWDM, defined as the wavelength separation between the transmission peak wavelengths of two adjacent channels, as shown, for example, by the separation of adjacent peaks 23 and 24, can be expressed by equation (1) below:

$$\Delta\lambda = \frac{\lambda^2}{2\Delta L} \quad (1)$$

where $\lambda$ is the central wavelength, and $\Delta L$ is the optical path length difference between connecting fibers 13 and 14, $\Delta L$ being equal to $n_1 l_1 - n_2 l_2$, where $n_1$ and $n_2$ are the respective refractive indexes and $l_1$ and $l_2$ are the respective lengths of the two connecting fibers 13 and 14. The window spacing of the MWDM, which is normally twice the channel spacing, is defined by the wavelength separation between two adjacent transmission peak wavelengths from a channel, as shown, for example, by the separation of peaks 21 and 23. By increasing the optical path length difference $\Delta L$, the channel separation is decreased so that more wavelengths can be transmitted on a single fiber, thereby forming devices known as dense WDMs.

The spectrum shown in FIG. 2 can be approximated mathematically according to equation (2) below:

$$\frac{I_o(\lambda)}{I_i(\lambda)} = \frac{1}{2} + \frac{\cos(\pi\lambda/\Delta\lambda)}{2} \quad (2)$$

where $\lambda$ is the central wavelength, and $\Delta\lambda$ is the channel spacing given by equation (1) above. As seen from equation (2) and FIG. 2, the spectral response within a passband of MWDM 10 is curved, i.e., it drops off sinusoidally from both sides of the central wavelength. This results in signals within the passband subject to non-uniform attenuation or gain. Ideally, in an optical communication system, a flat or uniform spectral response within the passband is preferred because the modulated optical signal can maintain a better waveform in a high data rate system. In addition, the light signal can remain at approximately the same power level if the signal wavelength varies within the passband. A flat spectral response is especially critical with dense WDM (DWDM) systems, in which groups of as much as 64 wavelengths are simultaneously transmitted in a fiber.

Accordingly, a structure and method are desired which achieves a flat spectral response within passbands of MWDMs.

SUMMARY OF THE INVENTION

The present invention provides a multi-window wavelength division multiplexer (MWDM) with a flat-top spectral response using a multi-window correcting filter with a shallow modulation depth and channel separation smaller than the MWDM. Two correcting filters can be connected to each of the two output ports of the MWDM or a single correcting filter can be connected to one of the two input ports of the MWDM. The resulting output spectrum has a more uniform gain within the passbands of the MWDM, i.e., a flatter spectral response.

The correcting filter can be made with an unbalanced Mach-Zehnder interferometer having two fused-fiber couplers connected by two connecting fibers of unequal optical path length. The fused-fiber couplers split the input signal unequally, i.e., they are not 3-dB couplers. By adjusting the splitting ratio and channel separation capability of the correcting filter, a desired correction to the spectral response of the MWDM can be obtained, thereby flattening the gain within passbands of the MWDM. In other embodiments, the correcting filter can be made with Fabry-Perot interferometers having a small end-face reflectivity and a channel separation smaller than the MWDM to produce an output spectrum having a more uniform gain within the passbands.

The invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

According to an aspect of the present invention, a multi-window wavelength division multiplexer (MWDM) is coupled to a correcting filter characterized by a shallow modulation depth and a channel separation smaller than the MWDM. A correcting filter can be coupled to an input of the MWDM or to each of the two outputs of the MWDM. By changing the modulation depth and/or channel separation of the correcting filter(s), the spectral response of the filter can be adjusted to produce a more uniform gain (i.e., a "flat-top" spectral response) across wavelengths of passbands within the MWDM.

Figure 2:
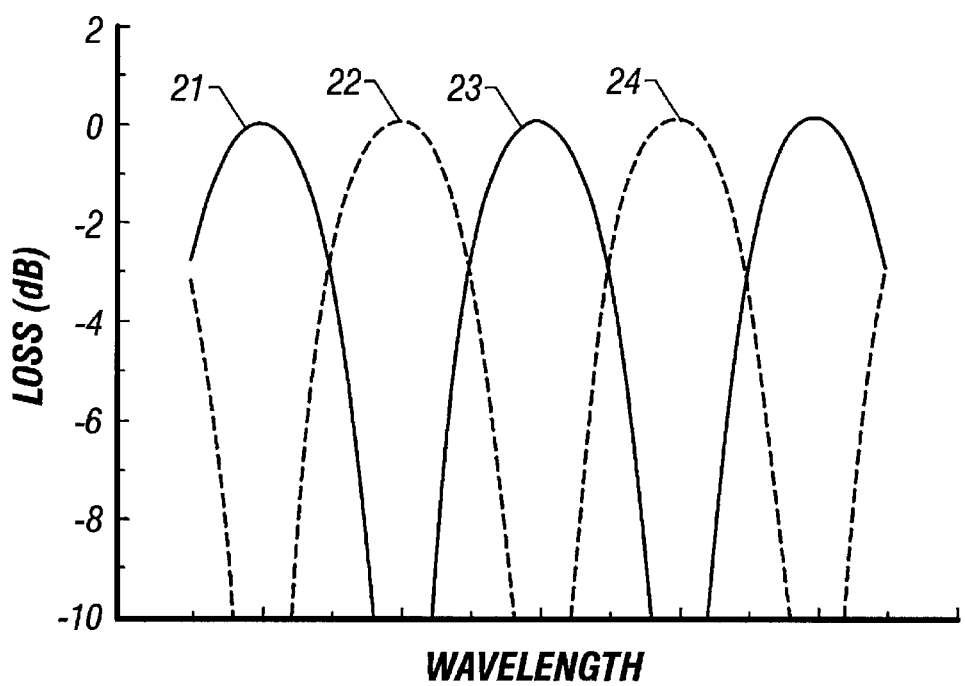
FIG. 2 shows a typical output optical spectra of the MWDM of FIG. 1 in logarithmic scale.
Figure 3A:
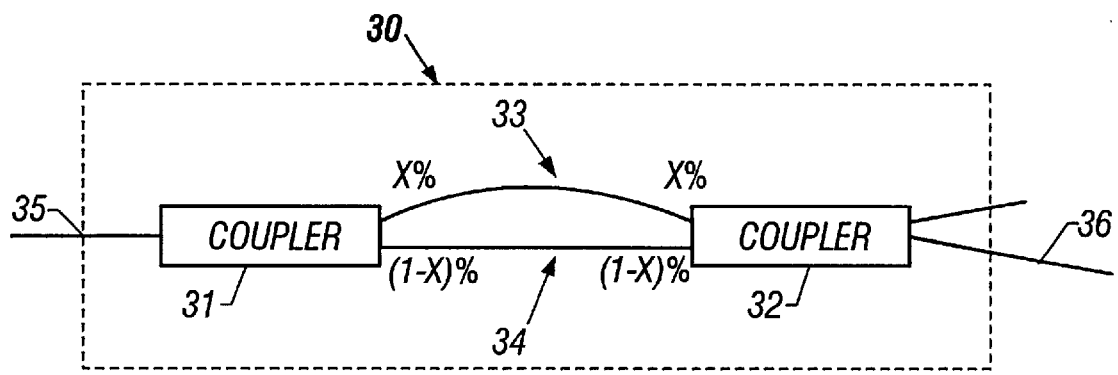
FIG. 3A shows a multi-window correcting filter formed from an unbalanced Mach-Zehnder interferometer with a non-equal splitting ratio according to one embodiment of the present invention.
Figure 3B:
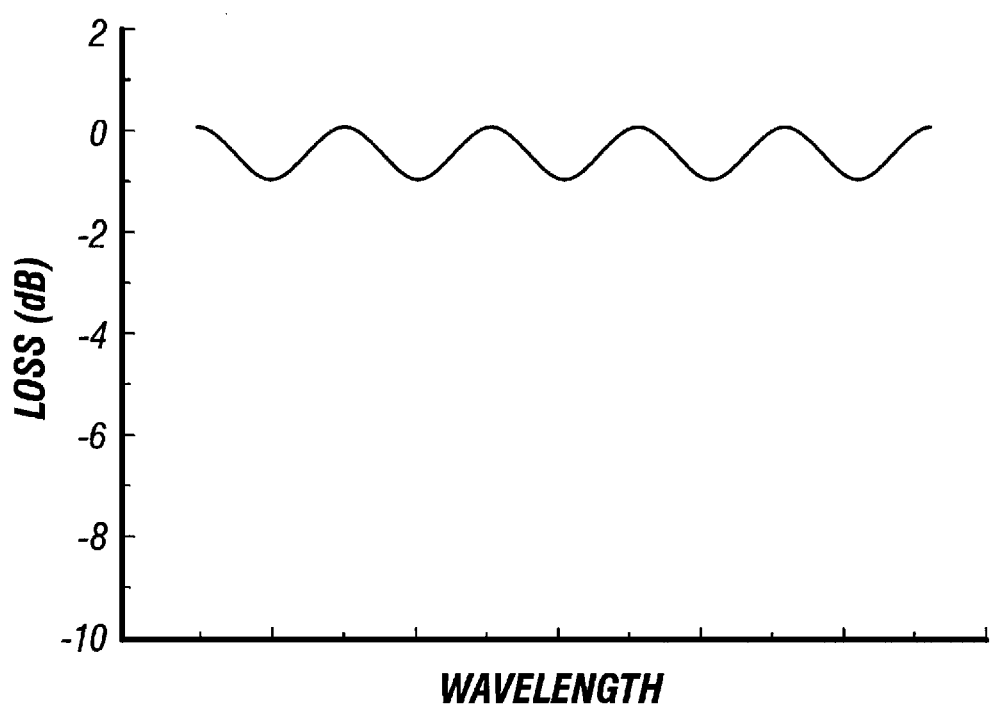
FIG. 3B shows a typical output optical spectrum of the MWF of FIG. 3A.

FIG. 3A shows a correcting filter 30 according to one embodiment of the present invention. Correcting filter 30 includes two fused-fiber couplers 31 and 32 coupled together by connecting fibers 33 and 34, where couplers 31 and 32 split a signal at input port 35 unequally at the two outputs, i.e., couplers 31 and 32 have a non-equal splitting ratio of X:(1-X), with X being not equal to 0.5 (which would be the case for a 3-dB coupler). Note that the splitting ratio of couplers 31 and 32 does not have to be identical. However, as the difference between the splitting ratios of couplers 31 and 32 increases, constructive interference decreases and a higher insertion loss occurs. A non-equal splitting ratio of couplers 31 and 32 results in a transmitted spectrum with a shallow modulation depth, typically within 0.5 to 2.0 dB, appearing at an output port 36 of coupler 32, as shown in FIG. 3B. The spectrum shown in FIG. 3B of correcting filter 30 can be approximated mathematically according to equation (3) below:

$$\frac{I_o(\lambda)}{I_i(\lambda)} = (1-m) + m\left[\frac{1}{2} + \frac{\cos(\pi\lambda/\Delta\lambda_c)}{2}\right] \quad (3)$$

where $\lambda$ is the central wavelength, m is the modulation depth of correcting filter 30, which depends on the splitting ratio of fused-fiber couplers 31 and 32, and $\alpha\lambda_c$ is the channel separation of filter 30. For a modulation depth of m=1 (i.e., a splitting ratio of 0.5:0.5), correcting filter 30 itself becomes a normal, uncorrected MWDM and has a spectrum similar to that shown in FIG. 2. Typically, m is approximately less than 0.2 to obtain a desired correction for flattening the spectral response of MWDM 10.

The channel separation $\Delta\lambda_c$ of correcting filter 30 can be changed by adjusting the optical path length difference $\Delta L$ of connecting fibers 33 and 34, $\Delta L$ being equal to $n_1 l_1 - n_2 l_2$, where $n_1$ and $n_2$ are the respective refractive indexes and $l_1$ and $l_2$ are the respective lengths of the two connecting fibers 33 and 34. As seen, $\Delta L$ can be changed by changing the refractive indexes of the connecting fibers relative to each other or by changing the actual lengths between the two connecting fibers. One way to change the refractive indexes is to make one of the connecting fibers more refractive index-sensitive to UV radiation, for example, by Ge-doping or hydrogen-loading, and then exposing both fibers to a level of UV radiation sufficient to obtain the desired difference between refractive indexes. Another method is to use connecting fibers of different refractive indexes. Yet another method is to fuse-splice a portion of fiber between a connecting fiber, with the fiber portion having a different refractive index or a different doping than the connecting fiber and/or the other connecting fiber. These methods, which are not limiting, are discussed in U.S. patent application Ser. No. 09/034,895, incorporated by reference above.

By increasing the optical path length difference $\Delta L$ between connecting fibers 33 and 34, the channel separation $\Delta\lambda$ decreases, as given by equation (1) above. With a smaller channel separation, the spectrum of correcting filter 30 at output port 36 exhibits more peaks within a passband. The channel separation capability of correcting filter 30 must be smaller than the channel separation of MWDM 10, preferably at 1/N of the channel spacing of the MWDM 10, where N is an integer greater than one (i.e., $\Delta\lambda_c = \Delta\lambda/N$).

Figure 1:
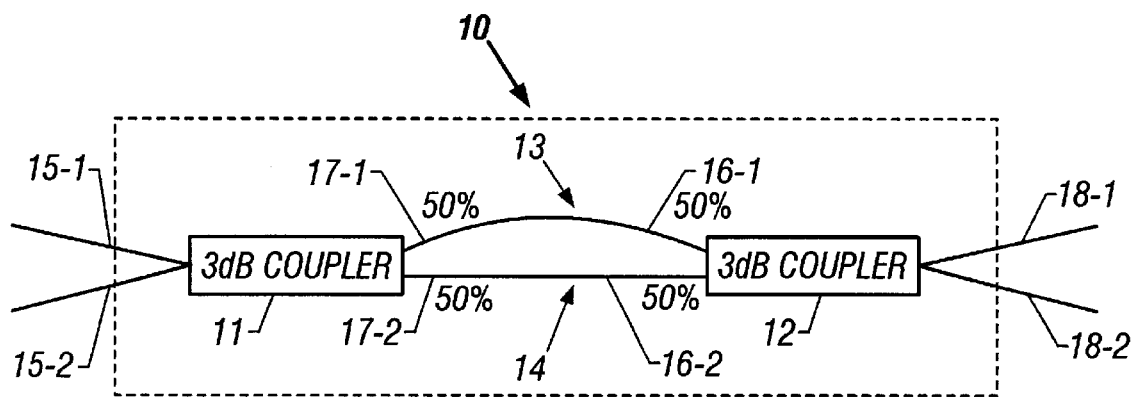
FIG. 1 shows a multi-window WDM (MWDM) using an unbalanced Mach-Zehnder interferometer.
Figure 4A:
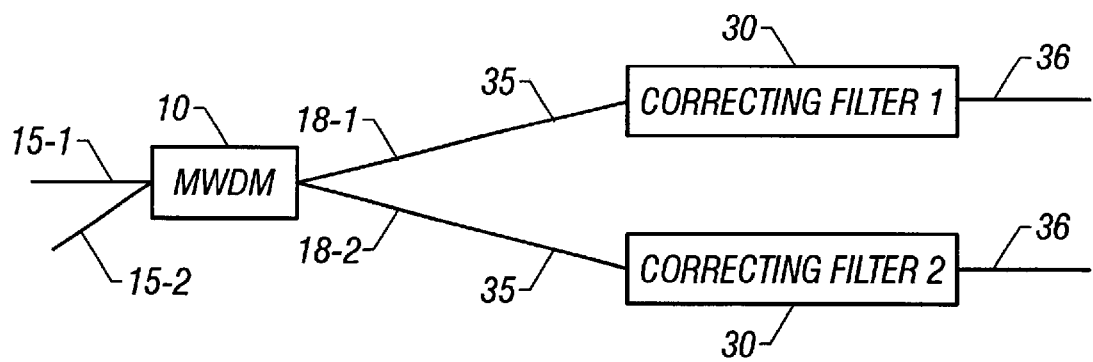
FIGS. 4A and 4B show different ways for connecting correcting filters to a MWDM.

To flatten the spectral response of MWDM 10 (shown in FIG. 2), separate correcting filters 30 can be coupled, at input ports 35, to each of the two output ports 18-1 and 18-2 of MWDM 10 of FIG. 1, as shown in FIG. 4A. The output is then taken at each output port 36 of the two correcting filters 30. Each of the two correcting filters 30 have the same channel separation $\Delta L$ and modulation depth m in order to obtain the same correction effect at both filter outputs. According to another embodiment, shown in FIG. 4B, a single correcting filter 30 is coupled, at output port 36, to input port 15-1 (shown in FIG. 4B) or 15-2 of MWDM 10, with the output being taken at the two output ports 18-1 and 18-2 of MWDM 10. When a single correcting filter 30 is used, the channel separation of the filter, i.e., 1/N of the channel separation of MWDM 10, is restricted to N being an even integer. However, the use of only a single correcting filter enables the MWDM to be smaller in size with less components.

Figure 4B:
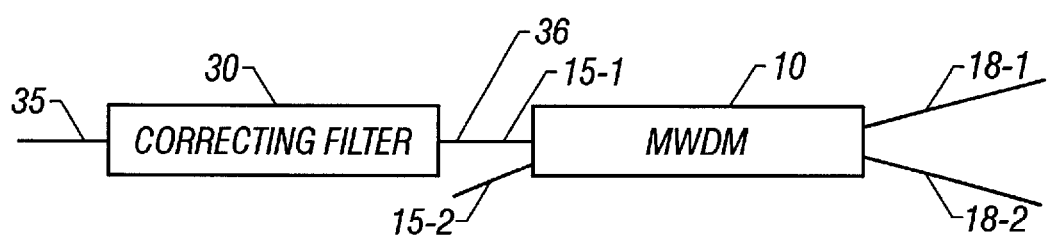
Figure 5A:
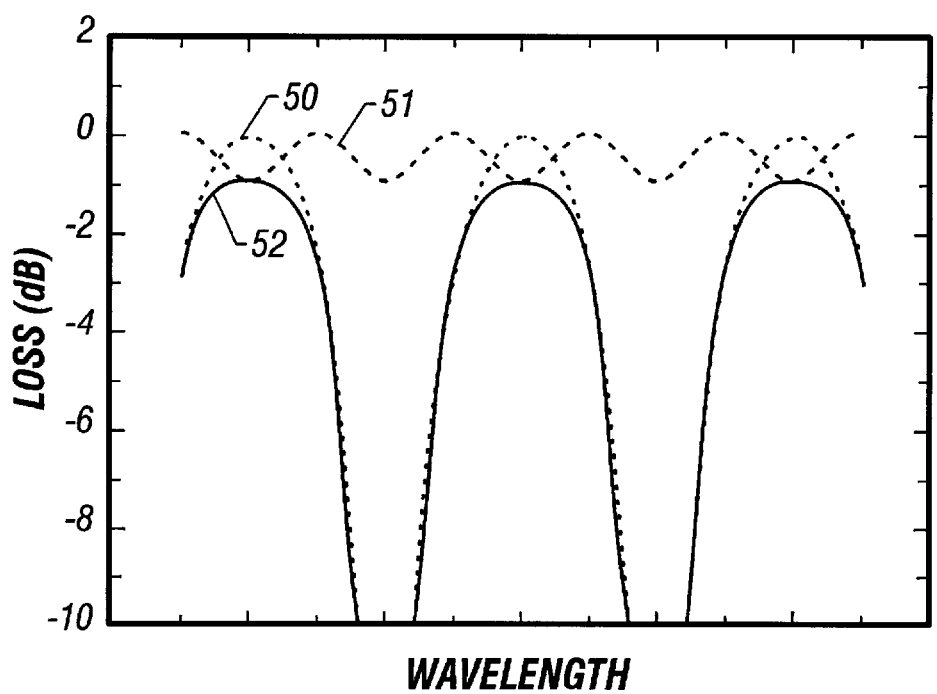
FIGS. 5A and 5B show output optical spectra of the correcting filter, uncorrected MWDM, and corrected MWDM with two different sets of parameters.
Figure 5B:
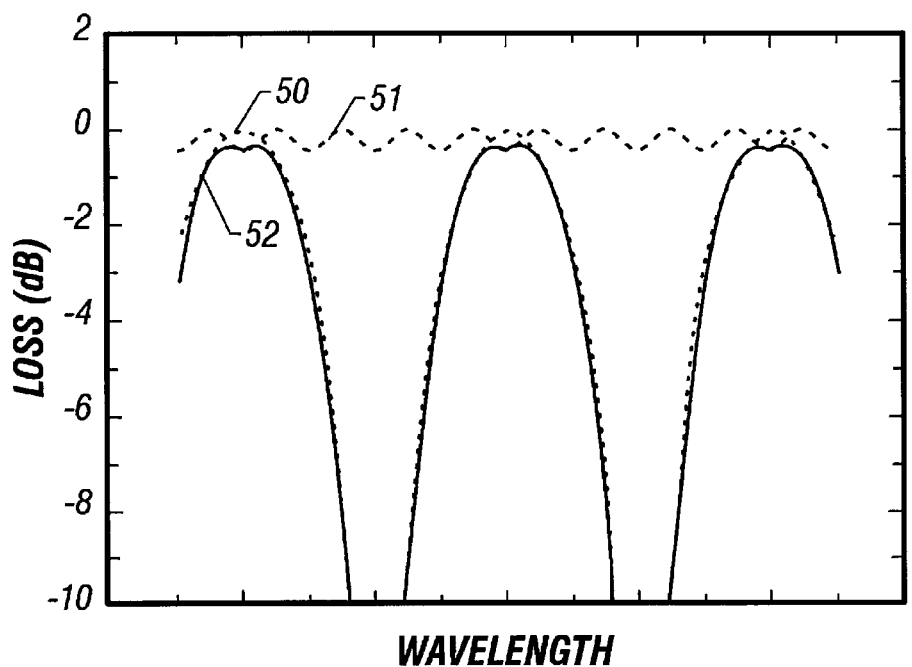

To illustrate the effect of correcting filter 30, the results with $\Delta\lambda_c=\Delta\lambda/2$ and m=0.1 are shown in FIG. 5A. Dotted line 50 represents the uncorrected spectrum at one of the output ports 18-1 or 18-2 of the MWDM 10, dashed line 51 represents the spectrum at output port 36 of correcting filter 30, and solid line 52 represents the spectrum of the MWDM using correcting filter 30 (either at output 36 of one of the two correcting filters 30 of FIG. 4A or at one of the outputs 18-1 or 18-2 of MWDM 10 of FIG. 4B). As seen, the resulting corrected spectrum has a more uniform gain within passbands, i.e., a flatter spectral output. Applicant has found that the 0.5-dB passband width of the spectrum is increased from the original 42% of the MWDM channel spacing ($\Delta\lambda$ to 66%. Another result with $\Delta\lambda_c=\Delta\lambda/4$ and m=0.05 is shown in FIG. 5B, where the 0.5-dB passband width is increased from 42% to 56%. As seen from FIGS. 5A and 5B, a higher modulation depth m results in a wider 0.5-dB passband, but also a higher insertion loss, while a lower modulation depth m provides a lower insertion loss, but also a lower 0.5-dB passband (or other size passband). Consequently, depending on the requirements of the MWDM, the modulation depth and channel separation can be adjusted to produce the desired amount of correction. Therefore, use of correcting filter 30 provides a flatter passband and increases the passband width for DWDM optical communication systems.

According to another embodiment of the present invention, the correcting filter can be made with Fabry-Perot etalons. The spectrum for an ideal Fabry-Perot etalon can be approximated mathematically according to equation (4) below:

$$\frac{I_o(\lambda)}{I_i(\lambda)} = \frac{(1-R)^2}{(1-R)^2 + 4R\sin^2\left(\frac{\pi\lambda}{2\Delta\lambda_c}\right)} \quad (4)$$

where $\lambda$ is the central wavelength, R is the intensity reflectivity of the two end-faces of the Fabry-Perot etalon, and $\Delta\lambda_c$ is the channel separation (or half of the free spectral range) which is determined by the separation of the two end-faces. The channel separation $\Delta\lambda_c$ can be decreased by increasing the separation of the end-faces until a desired separation is obtained.

Figure 6:
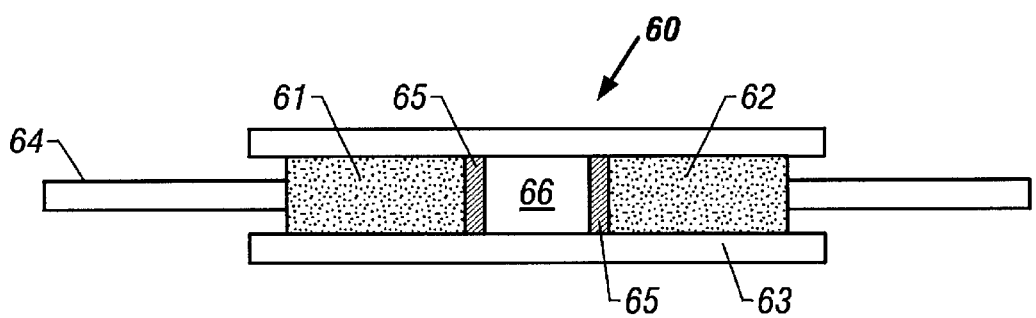
FIGS. 6 and 7 show correcting filters formed from Fabry-Perot filters using fiber collimators.

There are several methods to implement a fiber Fabry-Perot etalon, some of which are discussed here briefly. FIG. 6 shows a Fabry-Perot etalon 60 formed using micro-optics technology which utilizes fiber collimators 61 and 62 to collimate light beams entering along fiber 64. In FIG. 6, fiber collimators 61 and 62 have been end-face coated with a material 65 having a pre-determined reflectivity R. Material 65 can be either a metal or a dielectric multi-layer coating, or any other suitable material having the desired reflectivity R at the desired operating wavelength. Fiber collimators 61 and 62 are optically aligned with a pre-determined separation for the desired channel spacing, thereby creating an air gap 66 between material 65. Collimators 61 and 62 are then packaged in a housing 63 for mechanical stability.

Figure 7:
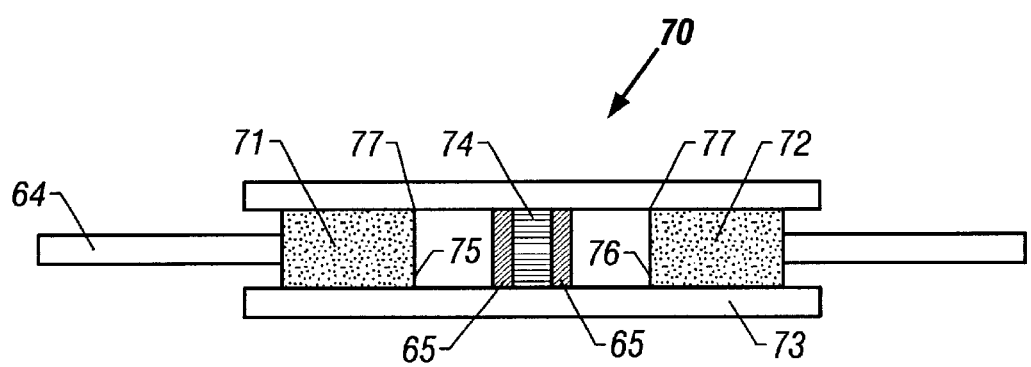
Figure 8:
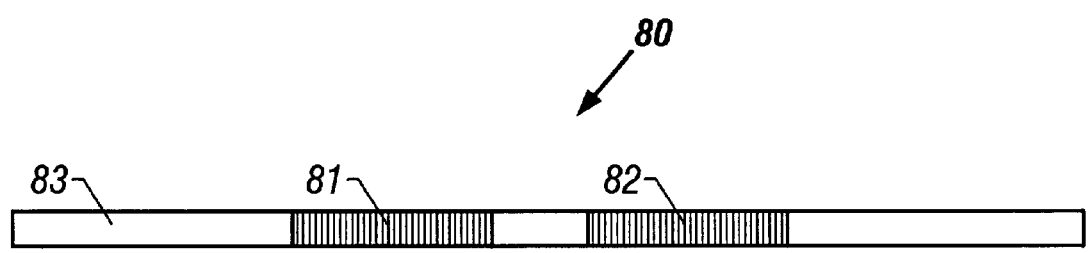
FIG. 8 shows a correcting filter formed from a Fabry-Perot filter using fiber Bragg gratings.

FIG. 7 shows another way to form a Fabry-Perot etalon 70 using fiber collimators. Fabry-Perot etalon 70 includes two fiber collimators 71 and 72 and a micro Fabry-Perot etalon 74 located therebetween. The end-faces 75 and 76 of respective collimators 71 and 72 are coated with an anti-reflection material 77, such as a dielectric. The end-faces of etalon 74 are coated with material 65 having reflectivity R. This reflectivity R and the thickness of etalon 74, as measured at the ends of material 65, determine the spectral response of Fabry-Perot etalon 70, as given by equation (4). As with Fabry-Perot etalon 60, the structure is again housed in a package 73 for mechanical stability. FIG. 8 shows yet another way to form a Fabry-Perot etalon 80. In FIG. 8, Bragg gratings 81 and 82 are imprinted into the core of an optic fiber 83 by UV light. Bragg gratings 81 and 82 have a pre-determined reflectivity R and separation for a desired channel separation, similar to that given by equation (4). This structure has the advantages of easy fabrication and lower insertion loss because the light is maintained in the fiber.

To correct or flatten the spectral response of an MWDM, Fabry-Perot etalon 60, 70, or 80, or any other suitable Fabry-Perot etalon can then be coupled to either the two output ports 18-1 and 18-2 of MWDM 10 or to one of the input ports 15-1 or 15-2 of MWDM 10, similar to that described with respect to the structures of FIGS. 4A and 4B above. For Fabry-Perot etalons, typically the reflectivity R is less than 0.2 in order to perform the desired correction function. By setting the channel separation at $\Delta\lambda_c=\Delta\lambda/2$ and the reflectivity at R=0.06, the output spectrum of the MWDM using a Fabry-Perot etalon as the correcting filter is similar to the spectrum shown in FIG. 5A, while $\Delta\lambda_c=\Delta\lambda/4$ and R=0.03 will produce results similar to the spectrum shown in FIG. 5B.

The above-described embodiments of the present invention are merely meant to be illustrative and not limiting. It will thus be obvious to those skilled in the art that various changes and modifications may be made without departing from this invention in its broader aspects. For example, although specific techniques were discussed for making unbalanced Mach-Zehnder interferometers and Fabry-Perot interferometers to be used as the spectral correcting filters, any suitable method to produce multi-window filters can be used in accordance with this invention. Therefore, the appended claims encompass all such changes and modifications as fall within the true spirit and scope of this invention.

I claim:

1. A multi-window wavelength division multiplexer (MWDM), comprising:
    a first unbalanced Mach-Zehnder interferometer (MZI) having a channel separation capability $\Delta\lambda$; and
    a first multi-window spectral correcting filter coupled to said unbalanced MZI, wherein said first correcting filter has a channel separation capability $\Delta\lambda_c=\Delta\lambda/N$, N being an integer greater than one, and a modulation depth m less than one.

2. The MWDM of claim 1, wherein said first correcting filter is coupled to an input port of said first unbalanced MZI.

3. The MWDM of claim 2, wherein N is an even integer.

4. The MWDM of claim 1, further comprising a second correcting filter having a similar channel separation capability and modulation depth as said first correcting filter to said first unbalanced MZI, wherein said first correcting filter is coupled to a first output port of said first unbalanced MZI and said second correcting filter is coupled to a second output port of said first unbalanced MZI.

5. The MWDM of claim 1, wherein said first unbalanced MZI comprises a first 3-dB fused-fiber coupler and a second 3-dB fused-fiber coupler, wherein said first and second 3-dB fused-fiber couplers are connected via a first and second connecting fiber.

6. The MWDM of claim 5, wherein said first and second connecting fibers have different optical path lengths.

7. The MWDM of claim 1, wherein said correcting filter comprises a second unbalanced MZI, wherein said second unbalanced MZI comprises two fused-fiber couplers with non-equal splitting ratios.

8. The MWDM of claim 7, wherein the splitting ratios of said two fused-fiber couplers is approximately the same.

9. The MWDM of claim 1, wherein m is less than approximately 0.2.

10. The MWDM of claim 1, wherein said correcting filter comprises a Fabry-Perot etalon having a reflectivity R.

11. The MWDM of claim 10, wherein R is approximately less than 0.2.

12. A method of forming a multi-window wavelength division multiplexer (MWDM) using an unbalanced Mach-Zehnder interferometer (MZI) having a channel separation capability $\Delta\lambda$, comprising:

coupling a first multi-window spectral correcting filter to said unbalanced MZI, wherein said first correcting filter has a channel separation capability $\Delta\lambda_c = \Delta\lambda/N$, N being an integer greater than one, and a modulation depth m less than one.

13. The method of claim 12, wherein said coupling comprises coupling said first correcting filter to an input port of said unbalanced MZI.

14. The method of claim 13, wherein N is an even integer.

15. The method of claim 12, further comprising coupling a second correcting filter having a similar channel separation capability and modulation depth as said first correcting filter to said unbalanced MZI, wherein said first correcting filter is coupled to a first output port of said first unbalanced MZI and said second correcting filter is coupled to a second output port of said first unbalanced MZI.

16. The method of claim 12, further comprising forming said correcting filter by coupling two fused-fiber couplers with non-equal splitting ratios.

17. The method of claim 12, wherein m is less than approximately 0.2.

18. The method of claim 12, wherein said correcting filter comprises a Fabry-Perot etalon having a reflectivity R.

19. The method of claim 18, wherein R is approximately less than 0.2.

* * * * *